United States Patent
Niiyama

(10) Patent No.: US 11,727,234 B2
(45) Date of Patent: Aug. 15, 2023

(54) PERFORMANCE OF PRINTING BASED ON DETECTED END PORTIONS OF MEDIUM

(71) Applicant: SEIKO EPSON CORPORATION, Tokyo (JP)

(72) Inventor: Shinichiro Niiyama, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/017,098

(22) Filed: Sep. 10, 2020

(65) Prior Publication Data

US 2021/0081734 A1    Mar. 18, 2021

(30) Foreign Application Priority Data

Sep. 13, 2019 (JP) .................. 2019-167521

(51) Int. Cl.
| | |
|---|---|
| G06K 15/00 | (2006.01) |
| G06T 7/90 | (2017.01) |
| B41J 3/407 | (2006.01) |
| G06K 15/02 | (2006.01) |
| B41J 13/00 | (2006.01) |
| B41J 2/21 | (2006.01) |

(52) U.S. Cl.
CPC ........ G06K 15/4065 (2013.01); B41J 2/2132 (2013.01); B41J 3/4078 (2013.01); B41J 13/0009 (2013.01); G06K 15/005 (2013.01); G06K 15/021 (2013.01); G06K 15/1805 (2013.01); G06T 7/90 (2017.01)

(58) Field of Classification Search
None
See application file for complete search history.

(56) References Cited

U.S. PATENT DOCUMENTS

| | | | |
|---|---|---|---|
| 10,101,701 B1* | 10/2018 | Soures | G03G 15/70 |
| 2004/0156666 A1* | 8/2004 | Ouchi | B41J 11/0095 400/708 |
| 2007/0263244 A1* | 11/2007 | Sugitani | B41J 3/543 358/1.15 |
| 2009/0065120 A1* | 3/2009 | Ueno | H05K 13/0469 156/64 |
| 2009/0160925 A1* | 6/2009 | Shinkawa | B41J 11/00212 347/102 |
| 2009/0295057 A1* | 12/2009 | Matsuyama | B65H 45/18 270/4 |

(Continued)

FOREIGN PATENT DOCUMENTS

| | | |
|---|---|---|
| EP | 01063096 | 12/2000 |
| EP | 3109052 | 12/2016 |

(Continued)

*Primary Examiner* — Miya J Williams
*Assistant Examiner* — Pawan Dhingra
(74) *Attorney, Agent, or Firm* — Workman Nydegger

(57) ABSTRACT

A printer includes: a printing section; a transport belt that transports a print medium; a camera that detects both end portions in an intersecting direction that intersects a transport direction of the print medium among end portions of the print medium placed on the transport belt; and a control section that causes the printing section to execute printing based on print data while one end portion of the both end portions detected by the camera is set as a print start position and a distance from the one end portion to the other end portion is set as a width of the print medium.

7 Claims, 11 Drawing Sheets

(56) References Cited

U.S. PATENT DOCUMENTS

| | | | | |
|---|---|---|---|---|
| 2010/0061621 A1* | 3/2010 | Stelzl | ................ | G01N 21/9505 |
| | | | | 382/145 |
| 2011/0306263 A1* | 12/2011 | Nakazono | ........... | B32B 38/1841 |
| | | | | 445/24 |
| 2012/0242828 A1* | 9/2012 | Franklin | .............. | H04N 5/2624 |
| | | | | 348/95 |
| 2014/0118762 A1* | 5/2014 | Nakura | .............. | H04N 1/00578 |
| | | | | 358/1.12 |
| 2014/0146164 A1* | 5/2014 | Bajema | ................ | H04N 17/002 |
| | | | | 348/89 |
| 2017/0302804 A1* | 10/2017 | Rokuhara | .......... | H04N 1/00713 |
| 2018/0339522 A1* | 11/2018 | Tsukada | ............... | G06K 15/027 |

FOREIGN PATENT DOCUMENTS

| | | |
|---|---|---|
| JP | 2005-246767 | 9/2005 |
| JP | 2005-269124 | 9/2005 |
| JP | 2006-044101 | 2/2006 |
| JP | 2008-068951 | 3/2008 |
| JP | 2014-097582 | 5/2014 |
| JP | 2015-189180 | 11/2015 |
| JP | 2016-221752 | 12/2016 |

\* cited by examiner

PERFORMANCE OF PRINTING BASED ON DETECTED END PORTIONS OF MEDIUM

The present application is based on, and claims priority from JP Application Serial Number 2019-167521, filed Sep. 13, 2019, the disclosure of which is hereby incorporated by reference here in its entirety.

BACKGROUND

1. Technical Field

The present disclosure relates to a printing apparatus, a printing control apparatus, and a control method of the printing apparatus.

2. Related Art

In the related art, there is known a technique of determining a print start position at which a print head starts printing based on an end portion of a print medium. For example, JP-A-2005-246767 discloses a printing apparatus that optically detects a side end portion of standard paper, obtains a positional deviation amount of the standard paper based on a detection signal, and determines a print start position based on the obtained positional deviation amount.

SUMMARY

In a printing apparatus that transports a print medium by a transport belt, a non-standard print medium can be placed at any position on the transport belt, and thus, in addition to the print start position, it is necessary to determine the width of the print medium in an intersecting direction that intersects a transport direction of the print medium. However, in this type of printing apparatus, in the related art, an operator has manually determined the print start position and the width of the print medium by measurement or the like, and thus, it takes time to perform the work before the start of printing, and it was not possible to start the printing immediately.

According to an aspect of the present disclosure, there is provided a printing apparatus including: a printing section; a transport belt that transports a print medium; a sensor that detects both end portions in an intersecting direction that intersects a transport direction of the print medium among end portions of the print medium placed on the transport belt; and a control section that causes the printing section to execute printing based on print data while one end portion of the both end portions detected by the sensor is set as a print start position and a distance from the one end portion to the other end portion is set as a width of the print medium.

In the printing apparatus according to the present disclosure, the printing section may include a print head, and the sensor may be provided downstream of a placement start position at which the transport belt starts placement of the print medium and upstream of the print head in the transport direction.

In the printing apparatus according to the present disclosure, the printing section may include a print head and a carriage on which the print head is mounted, and the sensor may be provided in the carriage.

In the printing apparatus according to the present disclosure, the control section may detect the both end portions by the sensor based on a color difference between a color of the transport belt and a color of the print medium.

In the printing apparatus according to the present disclosure, the control section may change the print start position determined by the sensor and the width of the print medium based on an input operation of a user, and cause the printing section to execute printing based on the print data, based on the changed print start position and the changed width of the print medium.

In the printing apparatus according to the present disclosure, the sensor may be a camera, and the control section may display a captured image of the both end portions obtained by the camera on a display section.

In the printing apparatus according to the present disclosure, the print data may be data for printing a pattern image having a print size changed in accordance with the width of the print medium determined by the sensor.

In the printing apparatus according to the present disclosure, the print medium may be a fabric.

According to another aspect of the present disclosure, there is provided a printing control apparatus for controlling a printing apparatus including a printing section, a transport belt that transports a print medium, and a sensor that detects both end portions in an intersecting direction that intersects a transport direction of the print medium among end portions of the print medium placed on the transport belt, the apparatus including: a control apparatus control section that causes the printing section to execute printing based on print data while one end portion of the both end portions detected by the sensor is set as a print start position and a distance from the one end portion to the other end portion is set as a width of the print medium.

According to still another aspect of the present disclosure, there is provided a control method of a printing apparatus including a printing section, a transport belt that transports a print medium, and a sensor that detects both end portions in an intersecting direction that intersects a transport direction of the print medium among end portions of the print medium placed on the transport belt, the method including: causing the printing section to execute printing based on print data while one end portion of the both end portions detected by the sensor is set as a print start position and a distance from the one end portion to the other end portion is set as a width of the print medium.

According to still another aspect of the present disclosure, there is provided a non-transitory computer-readable storage medium storing a program that is executed by a control section of a printing apparatus including a printing section, a transport belt that transports a print medium, and a sensor that detects both end portions in an intersecting direction that intersects a transport direction of the print medium among end portions of the print medium placed on the transport belt, in which the control section causes the printing section to execute printing based on print data while one end portion of the both end portions detected by the sensor is set as a print start position and a distance from the one end portion to the other end portion is set as a width of the print medium.

DESCRIPTION OF EXEMPLARY EMBODIMENTS

First Embodiment

First, a first embodiment will be described.

Figure 1:
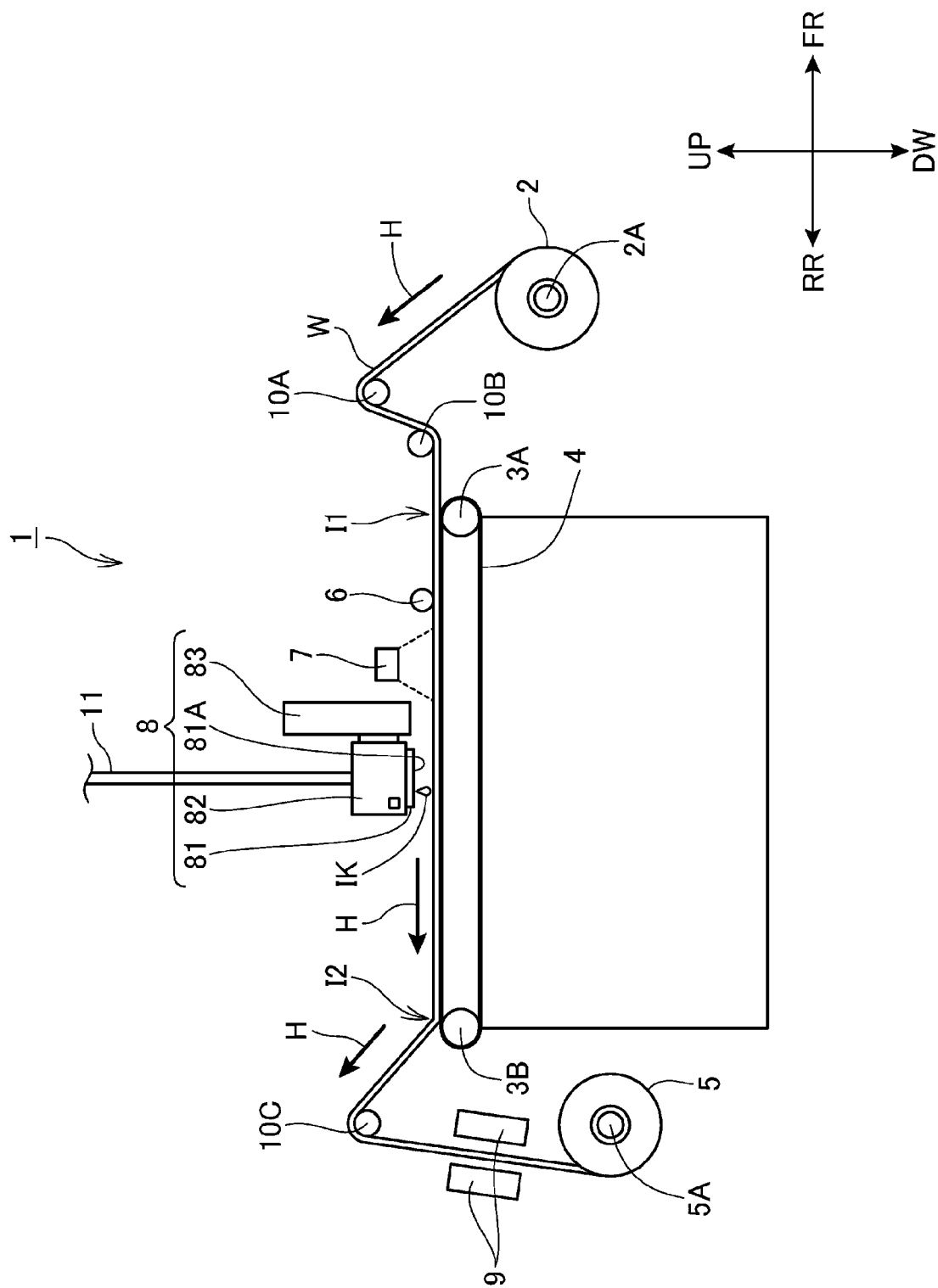
FIG. 1 is a schematic configuration view of a printer.

FIG. 1 is a schematic configuration view of a printer 1. The printer 1 corresponds to an example of a printing apparatus.

In FIGS. 1, 2, 3, 7, and 9, the front side of the installed state of the printer 1 is indicated by reference symbol FR, and the rear side of the printer 1 is indicated by reference symbol RR. In addition, in FIGS. 1, 2, 3, 7, and 9, the right side of the printer 1 is indicated by reference symbol R, and the left side of the printer 1 is indicated by reference symbol L. Further, in FIGS. 1, 2, 3, 7, and 9, the upper side of the printer 1 is indicated by reference symbol UP, and the lower side of the printer 1 is indicated by reference symbol DW.

The printer 1 is an ink jet type printing apparatus that includes a print head 81 for discharging an ink IK and discharges the ink IK onto a print medium W to form an image.

The print medium W is, for example, a fabric made of natural fibers or synthetic fibers. The printer 1 is a textile printing machine that performs textile printing onto the print medium W by causing the ink IK to adhere to the print medium W which is a fabric. Therefore, the print medium W is a textile printing material. In the present embodiment, a fabric is used as an example of the print medium W, but, as the print medium W, plain paper, high-quality paper, paper dedicated for ink jet recording such as glossy paper, or the like can also be used in addition to a fabric.

The printer 1 includes a delivery device 2, driven rollers 10A, 10B, and 10C, transport rollers 3A and 3B, a transport belt 4, and a winding device 5. Each of the sections configures a transport mechanism 1011 that transports the print medium W which will be described later.

The delivery device 2 is a device that delivers the long print medium W wound in a roll shape to the transport belt 4. The delivery device 2 is positioned on the most upstream side in a transport direction H of the print medium W. The delivery device 2 rotates a rotation shaft 2A counterclockwise in FIG. 1 to deliver the print medium W set on the rotation shaft 2A onto the transport belt 4 via the driven rollers 10A and 10B.

The transport rollers 3A and 3B are a pair of rollers that drive the endless transport belt 4. For example, the transport roller 3A is a driving roller, and the transport roller 3B is a driven roller. The transport belt 4 is a glue belt with an adhesive layer having adhesiveness formed on the surface thereof. The print medium W delivered from the delivery device 2 is adhesively fixed to the adhesive layer of the transport belt 4 and is transported in the transport direction H together with the transport belt 4. In addition, although the glue belt with an adhesive layer formed on the surface is exemplified as the transport belt 4 of the embodiment, the transport belt 4 is not limited to the adhesive belt and may be, for example, an electrostatic adsorption type belt.

The winding device 5 is a device that winds the print medium W transported by the transport belt 4 via the driven roller 10C. The winding device 5 is positioned on the most downstream side in the transport direction H of the print medium W. The winding device 5 rotates the rotation shaft 5A counterclockwise in FIG. 1 to wind the print medium W printed by the print head 81 in a roll shape around a winding reel set on the rotation shaft 5A.

The printer 1 includes a pressing roller 6. The pressing roller 6 is provided downstream of a placement start position I1 where the transport belt 4 starts the placement of the print medium W and upstream of a camera 7 which will be described later, in the transport direction H. The print medium W placed on the transport belt 4 is pressed against the transport belt 4 by the pressing roller 6. Accordingly, the printer 1 can cause the print medium W to reliably adhere to the adhesive layer formed on the surface of the transport belt 4, and can suppress a case where the print medium W placed on the transport belt 4 rises up from the transport belt 4. The pressing roller 6 is configured to be capable of reciprocating along the transport direction H in order to suppress a case where the print medium W has a roller trace.

The printer 1 includes the camera 7. The camera 7 corresponds to an example of a sensor. The camera 7 is provided downstream of the pressing roller 6 and upstream of a printing unit 8, in the transport direction H.

Figure 2:
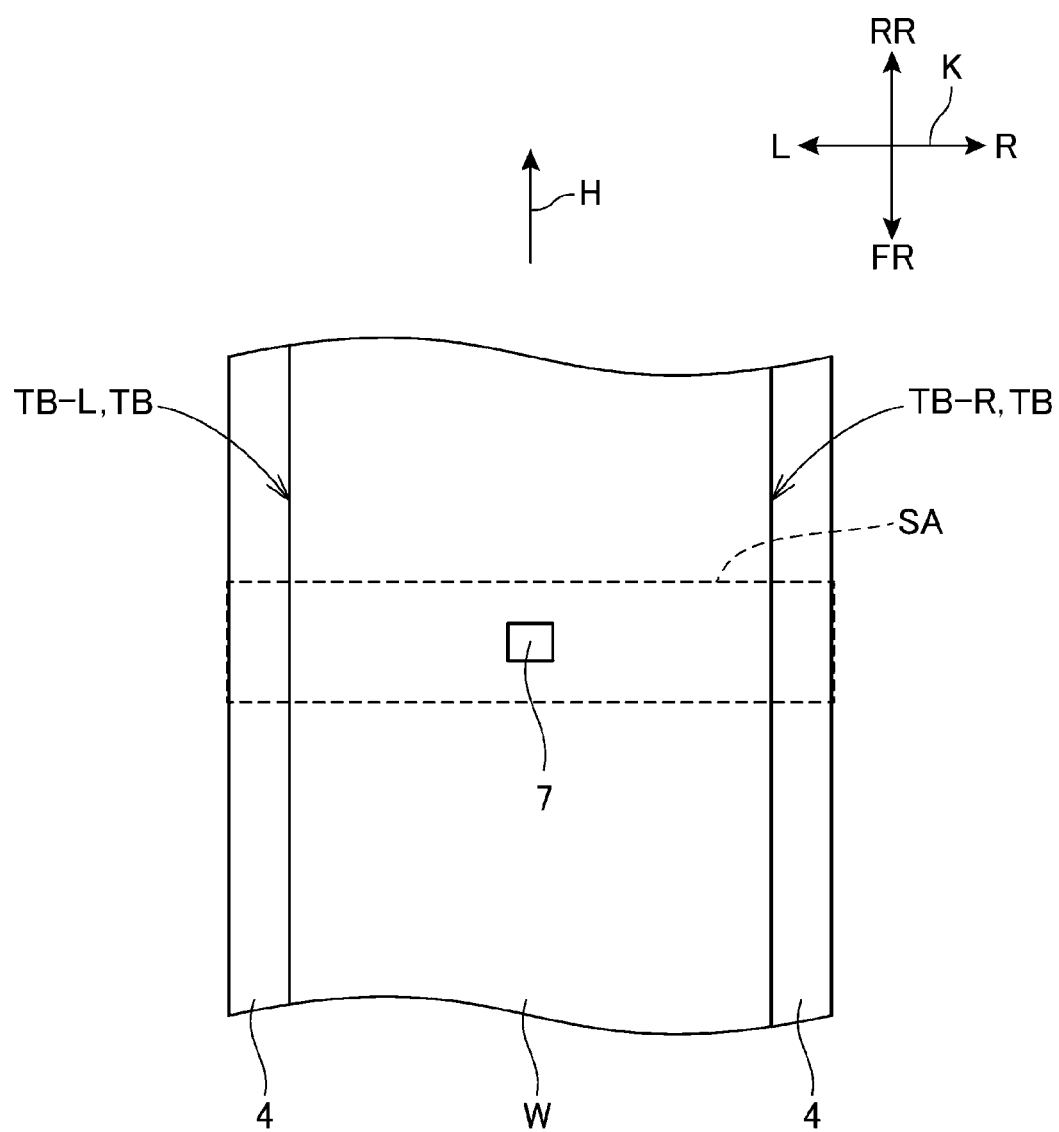
FIG. 2 is a view for describing an imaging range of a camera.

FIG. 2 is a view for describing an imaging range SA of the camera 7.

The camera 7 is provided above the transport belt 4. The camera 7 images the imaging range SA including two end portions TB in an intersecting direction K of the print medium W placed on the transport belt 4. Then, the camera 7 outputs captured image data 125, which is the data of a captured image SG, to a control section 100 which will be described later. The captured image SG of the camera 7 may be a still image or a video. The intersecting direction K is a direction that intersects the transport direction H and is also a scanning direction of a carriage 82. Further, in the embodiment, the intersecting direction K is a direction orthogonal to the transport direction H and is a left-right direction of the printer 1.

In the following description, of the two end portions TB in the intersecting direction K of the print medium W, the end portion TB on the right will be referred to as "right end portion" and given reference symbol "TB-R". Further, of the two end portions TB in the intersecting direction K of the print medium W, the end portion TB on the left will be referred to as "left end portion" and given reference symbol "TB-L". Further, when the right end portion TB-R and the left end portion TB-L are collectively referred to, the end portions will be referred to as "both end portions" and given reference symbol "RTB".

The imaging range SA of the camera 7 is a rectangular area that extends in the intersecting direction K, and is set so as to include both ends of the transport belt 4 in the intersecting direction K. In the embodiment, the imaging range SA is set such that both ends in the intersecting direction K of the imaging range SA coincide with both ends of the transport belt 4 in the intersecting direction K. Accordingly, when the width of the print medium W in the intersecting direction K is equal to or less than the width of the transport belt 4 in the intersecting direction K, the right end portion TB-R and the left end portion TB-L of the print medium W are included in the captured image SG of the camera 7. Note that the imaging range SA of the present embodiment is an example, and when the imaging range SA is set to include both ends of the transport belt 4 in the intersecting direction K, both ends of the imaging range SA may not coincide with both ends of the transport belt 4.

Returning to the description of FIG. 1, the printer 1 includes the printing unit 8. The printing unit 8 is provided downstream of the camera 7 and upstream of a placement end position 12 where the transport belt 4 ends the placement of the print medium W, in the transport direction H.

The printing unit 8 includes the carriage 82.

The print head 81 is mounted on the carriage 82. The print head 81 reciprocates on the print medium W in the intersecting direction K together with the carriage 82.

Here, a basic printing operation of the carriage 82, the print head 81, and the printer 1 will be described with reference to FIG. 3.

Figure 3:
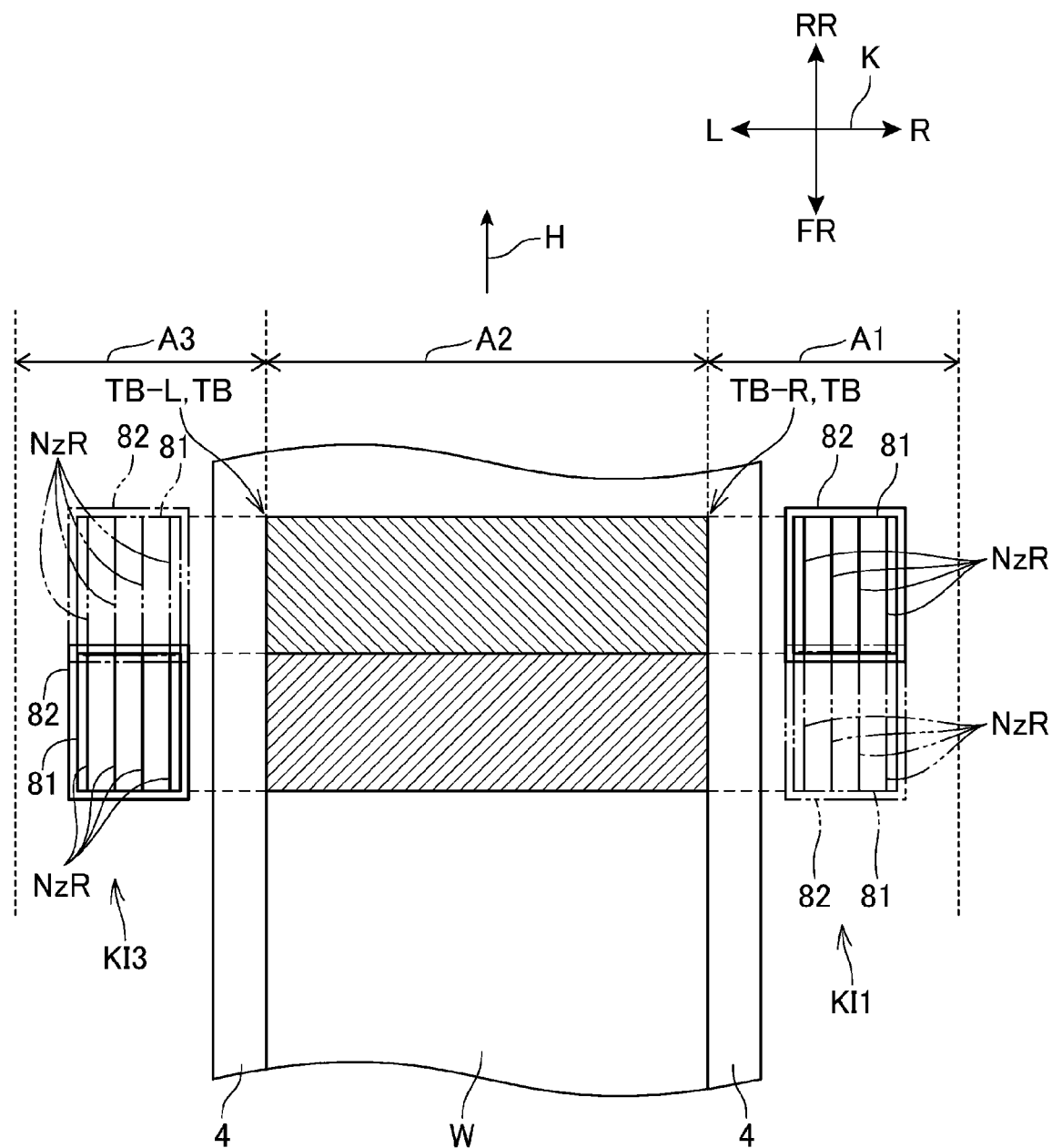
FIG. 3 is a view for describing a printing operation of a carriage, a print head, and a printer.

FIG. 3 is a view for describing the basic printing operation of the carriage 82, the print head 81, and the printer 1.

The carriage 82 reciprocates along a guide shaft (not illustrated). The guide shaft is a shaft that extends in the intersecting direction K and is provided at a position that opposes the transport belt 4. The carriage 82 reciprocates in the intersecting direction K along the guide shaft together with a gap adjusting mechanism 83 including a cam and the like.

As described above, the print head 81 is mounted on the carriage 82. In addition, various devices other than the print head 81 may be mounted on the carriage 82.

The print head 81 receives ink supply from an ink storage mechanism (not illustrated) via an ink supply path 11 and discharges the ink IK onto the print medium W placed on the transport belt 4. The ink storage mechanism is a mechanism that stores the ink IK, and includes, for example, an ink cartridge and an ink tank. The print head 81 has a plurality of nozzle rows NzR, in which a plurality of nozzles for discharging the ink IK are arranged in the transport direction H, arranged in the intersecting direction K on the surface that opposes the print medium W. For example, in order to discharge cyan (C), magenta (M), yellow (Y), and black (K) inks, the print head 81 has four nozzle rows NzR corresponding to each of the four colors.

The ink discharged by the print head 81 is not limited to the inks of the above-described colors, and may be inks such as light cyan, light magenta, orange, green, gray, light gray, white, metallic or the like. In addition to the ink IK, the print head 81 may be configured to discharge a penetrant onto the print medium W. The penetrant is a liquid that promotes penetration of the ink IK, which has adhered to the surface of the print medium W, to the back surface. In this case, the print head 81 discharges the penetrant toward the print medium W at the same time as the discharge of the ink IK or at a timing different from the discharge of the ink IK.

The carriage 82 is positioned in any of a non-printing area A1, a printing area A2, or a non-printing area A3 in the intersecting direction K. In addition, the non-printing areas A1 and A3 are areas outside the printing area, which is the outer side of the printing area A2 in the intersecting direction K.

The non-printing area A1 is an area in which the print head 81 cannot discharge the ink IK for the purpose of image formation. The non-printing area A1 is an area adjacent to the printing area A2 on the right of the printing area A2. The non-printing area A1 is an area that does not include the print medium W placed on the transport belt 4. Therefore, the print medium W is not positioned at a position corresponding to the print head 81 mounted on the carriage 82 positioned in the non-printing area A1. Note that a case where the carriage 82 is positioned in the non-printing area A1 means a case where the nozzle row NzR positioned on the leftmost among the nozzle rows NzR included in the print head 81 is positioned in the non-printing area A1 in the intersecting direction K. A maintenance mechanism that executes maintenance with respect to the print head 81 may be provided in the non-printing area A1.

The printing area A2 is an area in which the print head 81 discharges the ink IK for the purpose of image formation. The printing area A2 is an area pinched between the non-printing areas A1 and A3 in the intersecting direction K and is adjacent to the non-printing areas A1 and A3.

The non-printing area A3 is an area in which the print head 81 cannot discharge the ink IK for the purpose of image formation. The non-printing area A3 is an area adjacent to the printing area A2 on the left of the printing area A2. The non-printing area A3 is an area that does not include the print medium W placed on the transport belt 4. Therefore, the print medium W is not positioned at a position corresponding to the print head 81 mounted on the carriage 82 positioned in the non-printing area A3. Note that a case where the carriage 82 is positioned in the non-printing area A3 means a case where the nozzle row NzR positioned on the rightmost among the nozzle rows NzR included in the print head 81 is positioned in the non-printing area A3 in the intersecting direction K. A maintenance mechanism that executes maintenance with respect to the print head 81 may be provided in the non-printing area A3 instead of the non-printing area A1.

When discharging the ink IK onto the print medium W to form an image, the carriage 82 scans in the intersecting direction K starting from scan start positions KI1 and KI3. The scan start position KI1 is a position in the intersecting direction K and is a position in the non-printing area A1 when the carriage 82 starts scanning to the left. The carriage 82 positioned at the scan start position KI1 is positioned in the non-printing area A1. The scan start position KI3 is a position in the intersecting direction K and is a position in the non-printing area A3 when the carriage 82 starts scanning to the right. The carriage 82 positioned at the scan start position KI3 is positioned in the non-printing area A3.

For example, it is assumed that the carriage 82 is positioned at the scan start position KI1. When printing on the print medium W, the carriage 82 scans leftward and moves to the scan start position KI3. The print head 81 discharges an appropriate amount of ink IK from an appropriate nozzle at an appropriate timing in the printing area A2 while the carriage 82 scans to the left to form an image in the printing area A2. As a result, in the print medium W, printing is performed in an area that extends in the transport direction H by the length of the nozzle row NzR of the print head 81. For example, similar to multi-pass printing, when the nozzle rows NzR are divided into a plurality of nozzle groups for printing in the transport direction H, printing is performed in an area that extends in the transport direction H by the length of one divided nozzle group.

After the carriage 82 moves to the scan start position KI3, the transport belt 4 transports the print medium W in the transport direction H by a distance corresponding to the length of the nozzle row NzR according to the control of the control section 100. For example, similar to multi-pass printing, when the nozzle rows NzR are divided into a plurality of nozzle groups for printing in the transport direction H, the transport belt 4 transports the print medium W in the transport direction H by the distance corresponding to the length of one divided nozzle group.

Next, after transport by the transport belt 4, the carriage 82 switches the scanning direction to the right and scans from the scan start position KI3 toward the scan start position KI1. The print head 81 discharges an appropriate amount of ink IK from an appropriate nozzle at an appropriate timing in the printing area A2 while the carriage 82 scans to the right to form an image in the printing area A2. As a result, printing is performed in an area that extends in the transport direction H by the length of the nozzle row NzR, upstream of the area printed during the scanning to the right in the transport direction H. For example, similar to multi-pass printing, when the nozzle rows NzR are divided into a plurality of nozzle groups for printing in the transport direction H, printing is performed in an area that extends in the transport direction H by the length of one divided nozzle group.

In this manner, the carriage 82 and the print head 81 repeatedly perform the processing of scanning and printing leftward and the processing of scanning and printing rightward as many times as necessary for printing.

Returning to the description of FIG. 1, the printing unit 8 includes the gap adjusting mechanism 83. The gap adjusting mechanism 83 is a mechanism that adjusts a workpiece gap that is a distance between the print medium W and a nozzle surface 81A of the print head 81. The gap adjusting mechanism 83 is coupled to the carriage 82 and adjusts the workpiece gap by moving the carriage 82 in the up-down direction according to the control of the control section 100.

The printer 1 includes a drying unit 9. The drying unit 9 is provided upstream of the winding device 5 and downstream of the driven roller 10C in the transport direction H. In addition, the drying unit 9 may not be provided downstream of the driven roller 10C as long as the drying unit 9 is provided upstream of the winding device 5 and downstream of the print head 81 in the transport direction H. The drying unit 9 has, for example, a chamber that accommodates the print medium W and a heater that is disposed inside the chamber, and dries the undried ink IK on the print medium W by the heat of the heater.

Next, the functional configuration of the printer 1 will be described.

Figure 4:
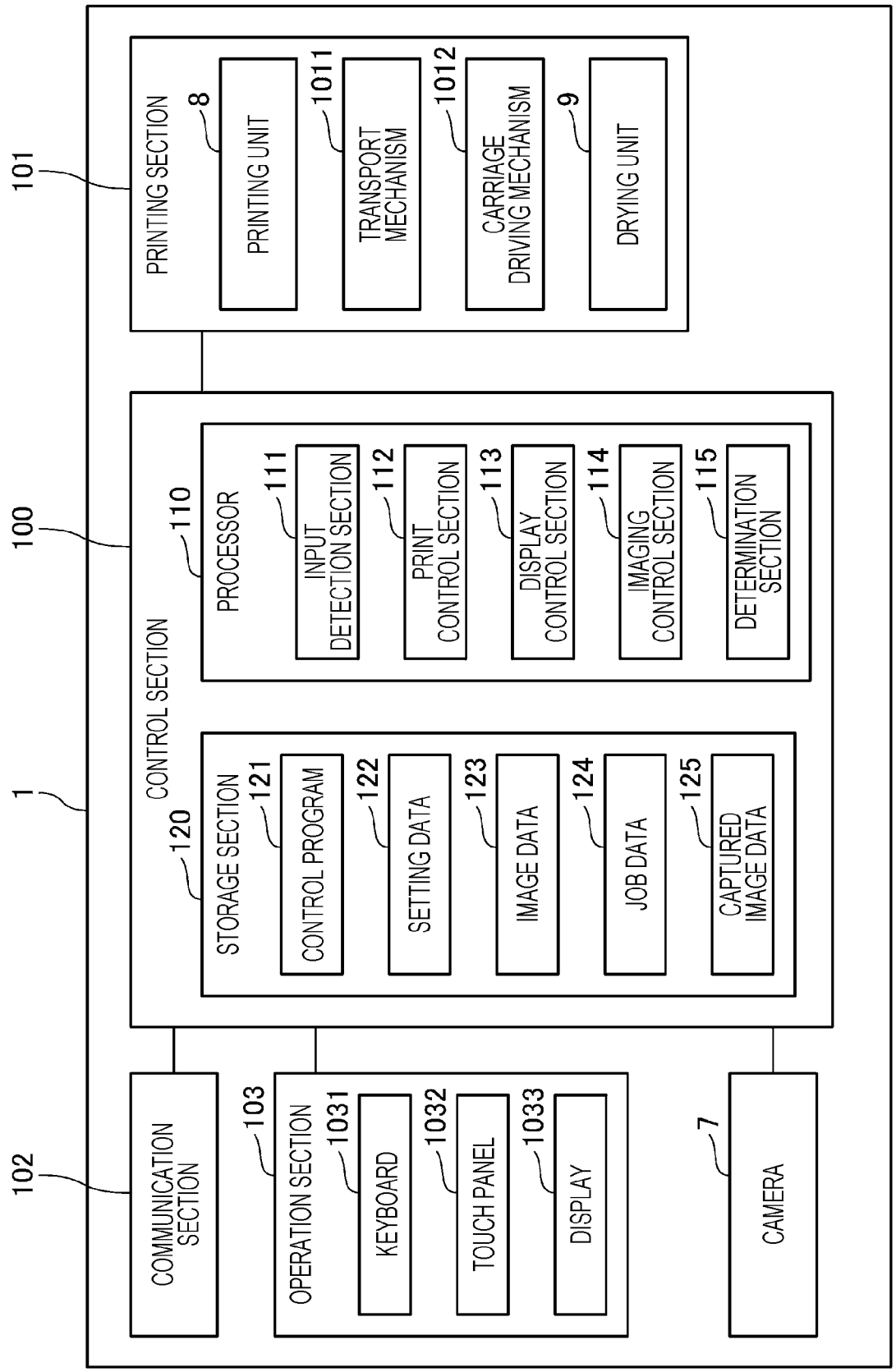
FIG. 4 is a block diagram illustrating a functional configuration of the printer.

FIG. 4 is a block diagram illustrating the functional configuration of the printer 1.

The printer 1 includes the control section 100.

The control section 100 includes a processor 110 that executes programs, such as a CPU or an MPU, and a storage section 120, and controls each section of the printer 1. The control section 100 executes various types of processing by cooperation of hardware and software such that the processor 110 reads a control program 121 stored in the storage section 120 and executes the processing. The control program 121 corresponds to an example of the program. The processor 110 functions as an input detection section 111, a print control section 112, a display control section 113, an imaging control section 114, and a determination section 115 by reading and executing the control program 121. Details of the functional blocks will be described later.

The storage section 120 has a storage area that stores a program executed by the processor 110 and data processed by the processor 110. The storage section 120 stores the control program 121 executed by the processor 110 and setting data 122 including various setting values related to the operation of the printer 1. The storage section 120 has a non-volatile storage area that stores programs or data in a non-volatile manner. In addition, the storage section 120 may include a volatile storage area and may be configured to temporarily store a program executed by the processor 110 or data to be processed.

The printer 1 includes a printing section 101.

The printing section 101 includes the printing unit 8, the transport mechanism 1011, a carriage driving mechanism 1012, and the drying unit 9. The transport mechanism 1011 is a mechanism for transporting the print medium W, and in addition to the delivery device 2, the driven rollers 10A, 10B, and 10C, the transport rollers 3A and 3B, the transport belt 4, and the winding device 5, the transport mechanism 1011 includes a motor that drives theses members. The carriage driving mechanism 1012 is a mechanism that reciprocates the carriage 82 in the scanning direction, and includes, for example, a motor as a driving source, a guide member that guides the movement of the carriage 82, a gear or a link that transmits the power of the motor to the carriage 82, and the like.

The printer 1 includes a communication section 102.

The communication section 102 is configured of communication hardware such as a connector and an interface circuit according to a predetermined communication standard, and communicates with an external apparatus of the printer 1 according to the control of the control section 100. The external apparatus of the printer 1 is, for example, a computer or a server apparatus. When the communication section 102 receives image data 123 from the external apparatus, the control section 100 stores the received image data 123 in the storage section 120. When the communication section 102 receives job data 124 for instructing printing from the external apparatus, the control section 100 stores the received job data 124 in the storage section 120.

The printer 1 includes an operation section 103.

The operation section 103 includes a keyboard 1031, a touch panel 1032, and a display 1033. The operation section 103 may be configured to include only one of the keyboard 1031 and the touch panel 1032. The display 1033 corresponds to an example of the display section. The keyboard 1031 has a plurality of keys operated by an operator, and outputs operation data indicating the operated keys to the control section 100. The display 1033 has a display screen such as an liquid crystal display (LCD) and displays an image according to the control of the control section 100. The touch panel 1032 is disposed so as to overlap the display screen of the display 1033, detects a touch operation on the display screen, and outputs operation data indicating the touch position to the control section 100.

The printer 1 includes the camera 7. The camera 7 images the imaging range SA according to the control of the control section 100 and outputs the captured image data 125 to the control section 100. The control section 100 stores the captured image data 125 acquired from the camera 7 in the storage section 120.

Next, the configuration of the control section 100 will be described.

The control section 100 includes the input detection section 111, the print control section 112, the display control section 113, the imaging control section 114, and the determination section 115.

The control section 100 also includes the storage section 120.

The storage section 120 stores the control program 121, the setting data 122, the image data 123, the job data 124, and the captured image data 125.

The input detection section 111 detects the input operation of the operator based on the operation data input from the keyboard 1031 and the touch panel 1032, and acquires the input content. When the data received via the communication section 102 is analyzed and the image data 123 is received, the input detection section 111 stores the image data 123 in the storage section 120. Further, when the job data 124 which is the data related to print job IJ is received, the input detection section 111 stores the job data 124 in the storage section 120.

The image data 123 is data of an image printed by the print head 81 on the print medium W, and the storage section 120 can store a plurality of pieces of image data 123.

The print control section 112 controls the printing section 101 according to the job data 124, and causes the printing section 101 to execute printing on the print medium W.

The job data 124 is data for the print control section 112 to execute printing in units of a job group 130 including one or a plurality of print jobs IJ. Here, the job group 130 will be described.

Figure 5:
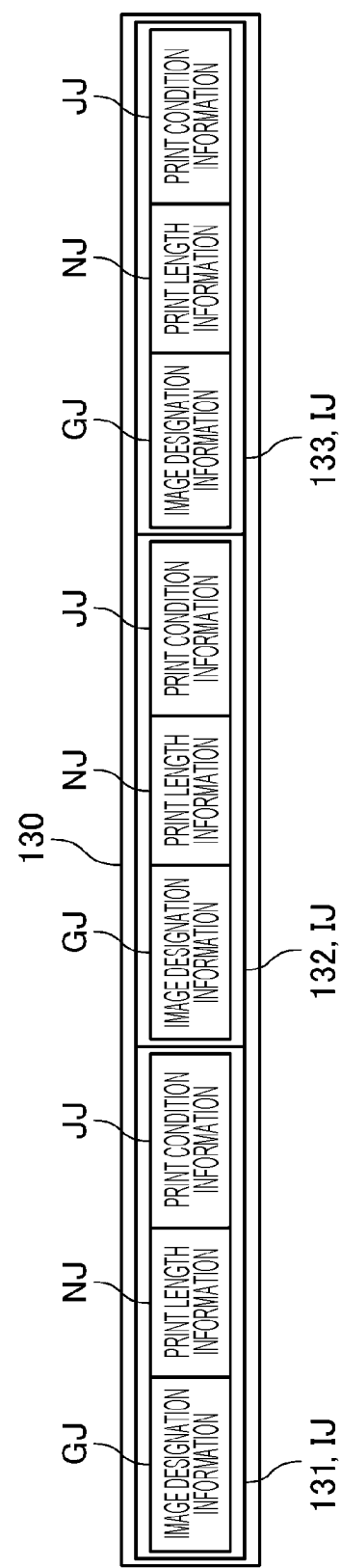
FIG. 5 is a schematic diagram illustrating a configuration of a job group.

FIG. 5 is a schematic view illustrating the configuration of the job group 130.

There is no limit to the number of print jobs IJ included in the job group 130 executed by the printer 1, and the job group 130 illustrated in FIG. 5 exemplifies a case including three print jobs 131, 132, and 133. The arrangement order of the print jobs 131, 132, and 133 in the job group 130 indicates the order in which the print control section 112 executes printing. Therefore, the print jobs 131, 132, and 133 are executed by the print control section 112 in the order of arrangement in the job group 130.

The print job 131 includes image designation information GJ, print length information NJ, and print condition information JJ. The image designation information GJ is information for designating an image to be printed on the print medium W, and designates any of the image data 123 stored in the storage section 120. For example, when the storage section 120 stores each of the plurality of pieces of image data 123 as one file, the image designation information GJ includes a file name or a file path that designates any one piece of the image data 123.

The print length information NJ is information for designating the print length that is the length for printing the image designated by the image designation information GJ. The print length designates the size of the print medium W on which the image of the print job 131 is printed in the transport direction H, for example, in units of meters. When the print length is greater than the image size of the image data 123, the print control section 112 repeats the image of the image data 123 and prints the image on the print medium W. In other words, the image of the image data 123 is a pattern image that is repeatedly printed. Therefore, the image data 123 may be data of an image smaller than the print length. Further, the image data 123 may be data of an image smaller than the size of the print medium W in the intersecting direction K, that is, the width of the print medium W. In this case, the print control section 112 also repeatedly prints the image of the image data 123 in the width direction of the print medium W.

The print condition information JJ is information indicating print conditions when the print head 81 prints an image. For example, the print conditions indicated by the print condition information JJ include the print resolution or the workpiece gap of the image printed by the print head 81. Further, the print condition indicated by the print condition information JJ may include print density, information for designating the ink discharge amount per unit area, and the like.

The print jobs 131, 132, and 133 included in the job group 130 include the image designation information GJ, the print length information NJ, and the print condition information JJ, respectively. Therefore, the print control section 112 can print different images in the print jobs 131, 132, and 133 included in the job group 130 with different print lengths and print conditions.

The print control section 112 continuously executes the print jobs 131, 132, and 133 included in the job group 130. Therefore, different images designated by each of the print jobs 131, 132, and 133 are connected and printed on the long print medium W. Therefore, for example, when printing a plurality of images in order, a blank does not occur at the position where the images are switched or the printing operation does not stop, and thus, the print control section 112 can reduce the waste of the print medium W while suppressing deterioration of productivity of the printer 1, and can efficiently performing printing.

The job data 124 can be configured to include the data of the plurality of job groups 130.

The print control section 112 refers to the job data 124 and acquires the data of the job group 130 designated by the operation of the operation section 103. The print control section 112 prints the print jobs 131, 132, and 133 included in the designated job group 130 in the order included in the job group 130.

The display control section 113 controls the display 1033 to display various images. The display control section 113 of the embodiment displays a print setting screen 300 on the display 1033. The print setting screen 300 will be described later.

The imaging control section 114 controls the camera 7 to execute imaging, acquires the captured image data 125 from the camera 7, and stores the acquired captured image data 125 in the storage section 120.

The determination section 115 executes the processing of determining the width of the print medium W in the intersecting direction K and the processing of determining the print start position. The determination section 115 determines the width of the print medium W in the intersecting direction K and the print start position based on the captured image data 125 stored in the storage section 120. The print start position is a position in the intersecting direction K, and is a position of the print head 81 that starts the job group 130. The specific determination method of the determination section 115 will be described later. The determination section 115 outputs the determined width of the print medium W and information indicating the print start position to the display control section 113.

Next, the operation of the printer 1 will be described.

Figure 6:
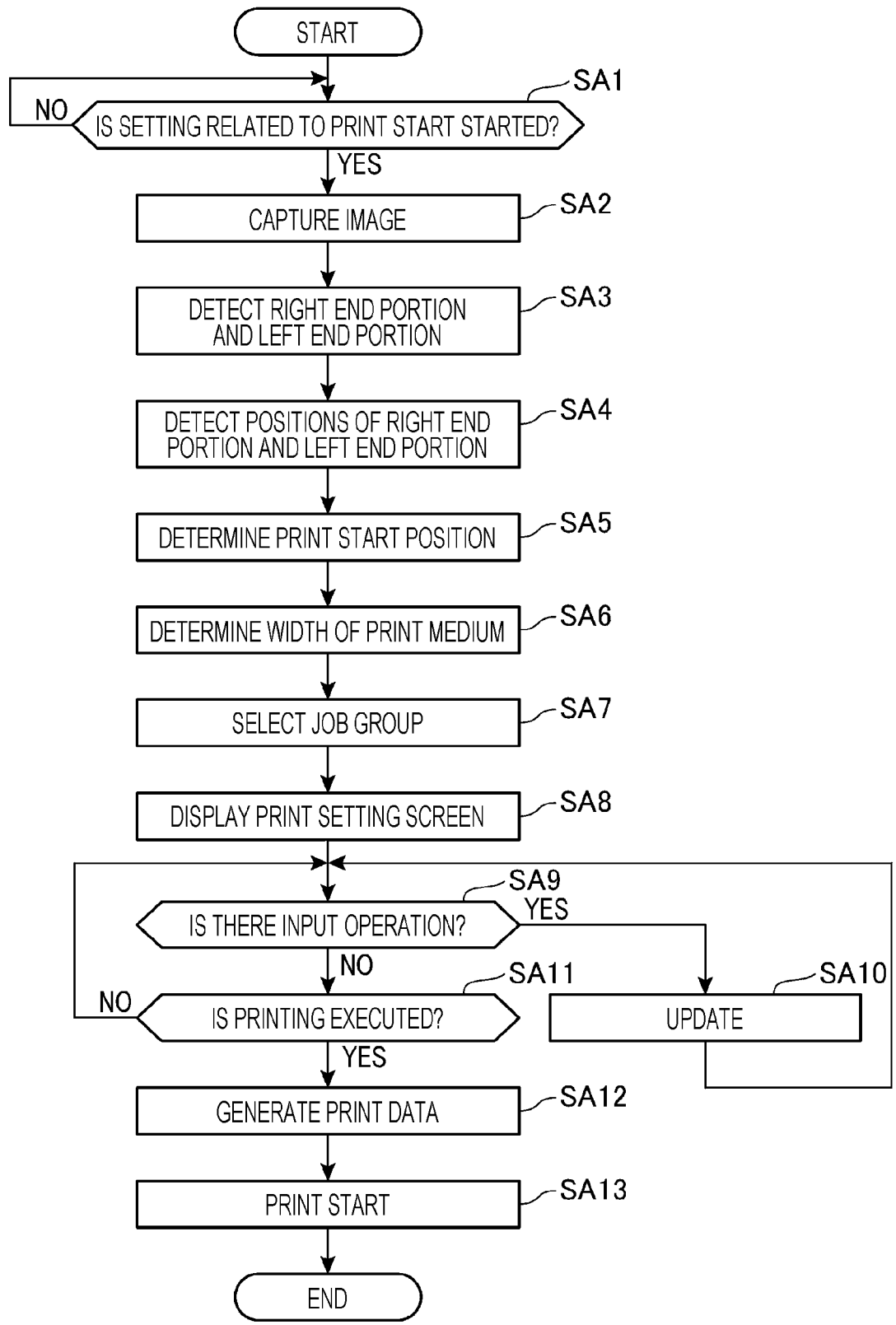
FIG. 6 is a flowchart illustrating an operation of the printer.

FIG. 6 is a flowchart illustrating the operation of the printer 1 and illustrates the setting operation related to print start. At the start of the flowchart of FIG. 6, it is assumed that the print medium W is appropriately set so as to be transported by the transport belt 4.

The determination section 115 determines whether or not to start the setting related to print start (step SA1). For example, when the input operation detected by the operation section 103 is an operation for instructing the start of print setting, the determination section 115 makes a positive determination in step SA1.

When the determination section 115 determines to start the setting related to the print start (step SA1: YES), the imaging control section 114 images the imaging range SA with the camera 7 (step SA2). The imaging control section 114 stores the captured image data 125 obtained by the imaging of the camera 7 in the storage section 120.

Next, the determination section 115 detects the right end portion TB-R and the left end portion TB-L of the print medium W based on the captured image SG indicated by the captured image data 125 stored in the storage section 120 (step SA3). In the embodiment, detection of the right end portion TB-R and the left end portion TB-L of the print medium W means detection of the right end and the left end of the print medium W. The same applies to detection of the positions of the right end portion TB-R and the left end portion TB-L of the print medium W.

For example, in step SA3, the determination section 115 grayscales the captured image SG, performs edge detection with respect to the captured image SG after grayscale, and detects the right end portion TB-R and the left end portion TB of the print medium W. In the embodiment, the color of the transport belt 4 and the color of the print medium W are different from each other. For example, while the transport belt 4 is black, the print medium W is white. Therefore, the determination section 115 can easily detect the right end portion TB-R and the left end portion TB-L of the print medium W by the edge detection. In particular, when the transport belt 4 is black and the print medium W is white, the determination section 115 can detect the right end portion TB-R and the left end portion TB-L of the print medium W with high precision and accuracy.

The method of detecting the right end portion TB-R and the left end portion TB-L of the print medium W based on the color difference is not limited to the edge detection. In addition, the method of detecting the right end portion TB-R and the left end portion TB-L of the print medium W is not limited to the detection method based on the color difference between the color of the transport belt 4 and the color of the print medium W.

Next, the determination section 115 detects the position in the intersecting direction K for each of the detected right end portion TB-R and left end portion TB-L (step SA4).

Figure 7:
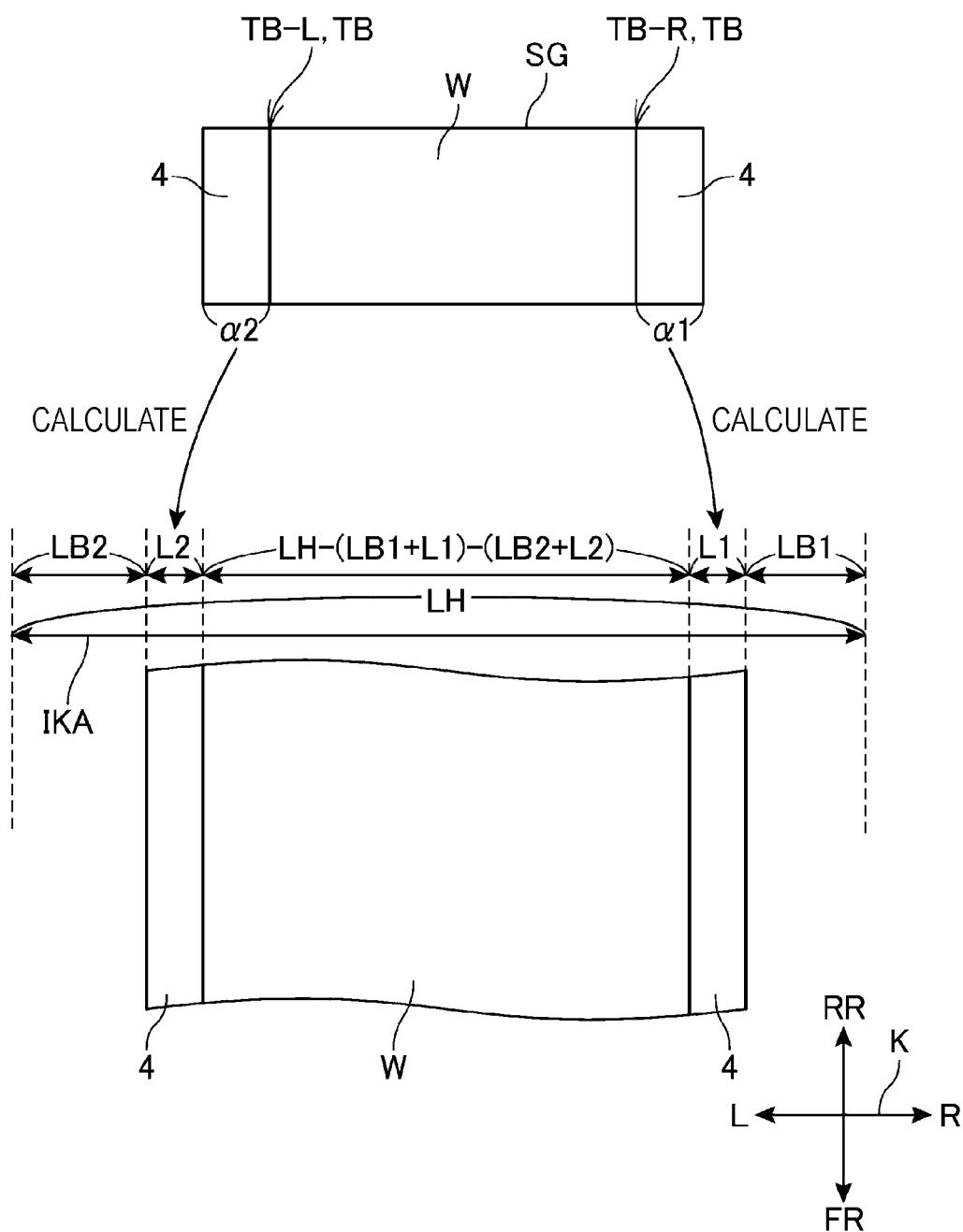
FIG. 7 is a view for describing detection of a position in an intersecting direction of a right end portion and a left end portion.

FIG. 7 is a view for describing the detection of the positions of the right end portion TB-R and the left end portion TB-L in the intersecting direction K.

In FIG. 7, the longitudinal direction of the captured image SG is the intersecting direction K, and the upward direction when viewed in a front view of FIG. 7 is the transport direction H in the lateral direction of the captured image SG. As described above, the imaging range SA of the camera 7 of the embodiment is set such that both ends in the intersecting direction K coincide with both ends of the transport belt 4 in the intersecting direction K. Therefore, the captured image SG illustrated in FIG. 7 is an image from the right end to the left end of the transport belt 4. Therefore, the left end of the captured image SG illustrated in FIG. 7 corresponds to the left end of the transport belt 4, and the right end of the captured image SG illustrated in FIG. 7 corresponds to the right end of the transport belt 4.

In FIG. 7, it is assumed that the determination section 115 detects the right end portion TB-R of the print medium W at a position separated by α1 pixel to the left from the right end of the captured image SG in the processing of step SA4. In addition, in FIG. 7, it is assumed that the determination section 115 detects the left end portion TB-L of the print medium W at a position separated by α2 pixel to the right from the left end of the captured image SG in the processing of step SA4. When both ends of the captured image SG and both ends of the transport belt 4 do not coincide with each other, the positions of both end portions RTB are detected in consideration of the pixels that do not coincide with each other.

The determination section 115 calculates the distance from the right end of the transport belt 4 to the right end portion TB-R of the print medium W, based on the imaging magnification of the camera 7 and the number of pixels from the right end of the captured image SG to the detected position of the right end portion TB-R. In FIG. 7, the determination section 115 calculates "L1" as the distance from the right end of the transport belt 4 to the right end portion TB-R of the print medium W. In addition, the imaging magnification of the camera 7 is stored as information in a predetermined storage area of the printer 1 or an external apparatus.

Further, the determination section 115 calculates the distance from the left end of the transport belt 4 to the left end portion TB-L of the print medium W, based on the imaging magnification of the camera 7 and the number of pixels from the left end of the captured image SG to the position of the left end portion TB-L in the captured image SG. In FIG. 7, the determination section 115 calculates "L2" as the distance from the left end of the transport belt 4 to the left end portion TB-L of the print medium W.

Next, the determination section 115 detects the positions of the right end portion TB-R and the left end portion TB-L of the print medium W in the intersecting direction K based on the calculated distance.

In FIG. 7, it is assumed that the distance of a movable range IKA, which is a range in which the carriage 82 can move in the intersecting direction K, is "LH". In addition, the movable range IKA is a range from the right end of the carriage 82 when the carriage 82 is positioned on the most right to the left end of the carriage 82 when the carriage 82 is positioned on the most left. The movable range IKA is not limited to the range based on the carriage 82, and may be a range based on the nozzle row NzR of the print head 81, for example.

Further, in FIG. 7, the right end of the transport belt 4 is positioned at a position separated by "LB1" from the right end of the movable range IKA leftward in the intersecting direction K, and the left end of the transport belt 4 is positioned at a position separated by "LB2" from the left end of the movable range IKA rightward in the intersecting direction K. The positional relationship between the movable range IKA and the transport belt 4 in the intersecting direction K is stored in a predetermined storage area of the printer 1 or the external apparatus as information which is appropriately determined in advance.

In a case of FIG. 7, the determination section 115 detects a position separated by "L1" leftward from the right end of the transport belt 4 in the intersecting direction K as a position of the right end portion TB-R of the print medium W in the intersecting direction K. In other words, the determination section 115 detects a position separated by "LB1+L1" leftward from the right end of the movable range IKA as a position of the right end portion TB-R of the print medium W.

In addition, in a case of FIG. 7, the determination section 115 detects a position separated by "L2" rightward from the left end of the transport belt 4 in the intersecting direction K as a position of the left end portion TB-R of the print medium W in the intersecting direction K. In other words, the determination section 115 detects the position separated by "LB2+L2" rightward from the left end of the movable range IKA as a position of the left end portion TB-L of the print medium W.

The detection method illustrated in FIG. 7 is an example of a method of detecting the positions of the right end portion TB-R and the left end portion TB-L, and may be a method that can detect the positions of the right end portion TB-R and the left end portion TB-L of the print medium W from the captured image SG.

Returning to the description of FIG. 6, the determination section 115 determines the print start position based on the positions of the right end portion TB-R and the left end portion TB-L of the print medium W detected in step SA3 (step SA5).

In step SA5, when starting the execution of the job group 130, when the initial scanning of the carriage 82 is leftward scanning, the determination section 115 determines the position of the right end portion TB-R of the print medium W, which is detected in step SA4, as the print start position. In this case, the right end portion TB-R corresponds to one end portion, and the left end portion TB-L corresponds to the other end portion. In a case of FIG. 7, the determination section 115 determines the position separated by "LB1+L1" to the left from the right end of the movable range IKA as the print start position.

In addition, in step SA5, when starting the execution of the job group 130, when the initial scanning of the carriage 82 is rightward scanning, the determination section 115 determines the position of the left end portion TB-L of the print medium W, which is detected in step SA4, as the print start position. In this case, the left end portion TB-L corresponds to one end portion, and the right end portion TB-R corresponds to the other end portion. In a case of FIG. 7, the determination section 115 determines the position separated by "LB2+L2" rightward from the left end of the movable range IKA as the print start position.

Next, the determination section 115 determines the width of the print medium W in the intersecting direction K based on the positions of the right end portion TB-R and the left end portion TB-L of the print medium W detected in step SA5 (step SA6). The processing order of steps SA5 and SA6 may be reversed.

In step SA6, the determination section 115 determines the separation distance in the intersecting direction K between the right end portion TB-R and the left end portion TB-L detected in step SA3 as the width of the print medium W in the intersecting direction K. In a case of FIG. 7, the determination section 115 determines the distance "LH−(LB1+L1)−(LB2+L2)" as the width of the print medium W in the intersecting direction K.

Next, the determination section 115 selects the job group 130 to be executed from the job groups 130 included in the job data 124 according to the input operation detected by the operation section 103 (step SA7).

Next, the display control section 113 displays a print setting screen 300 on the display 1033 (step SA8). The display control section 113 displays the print setting screen 300 on the display 1033 based on the selected job group 130, the print start position and the width of the print medium W determined by the determination section 115.

Figure 8:
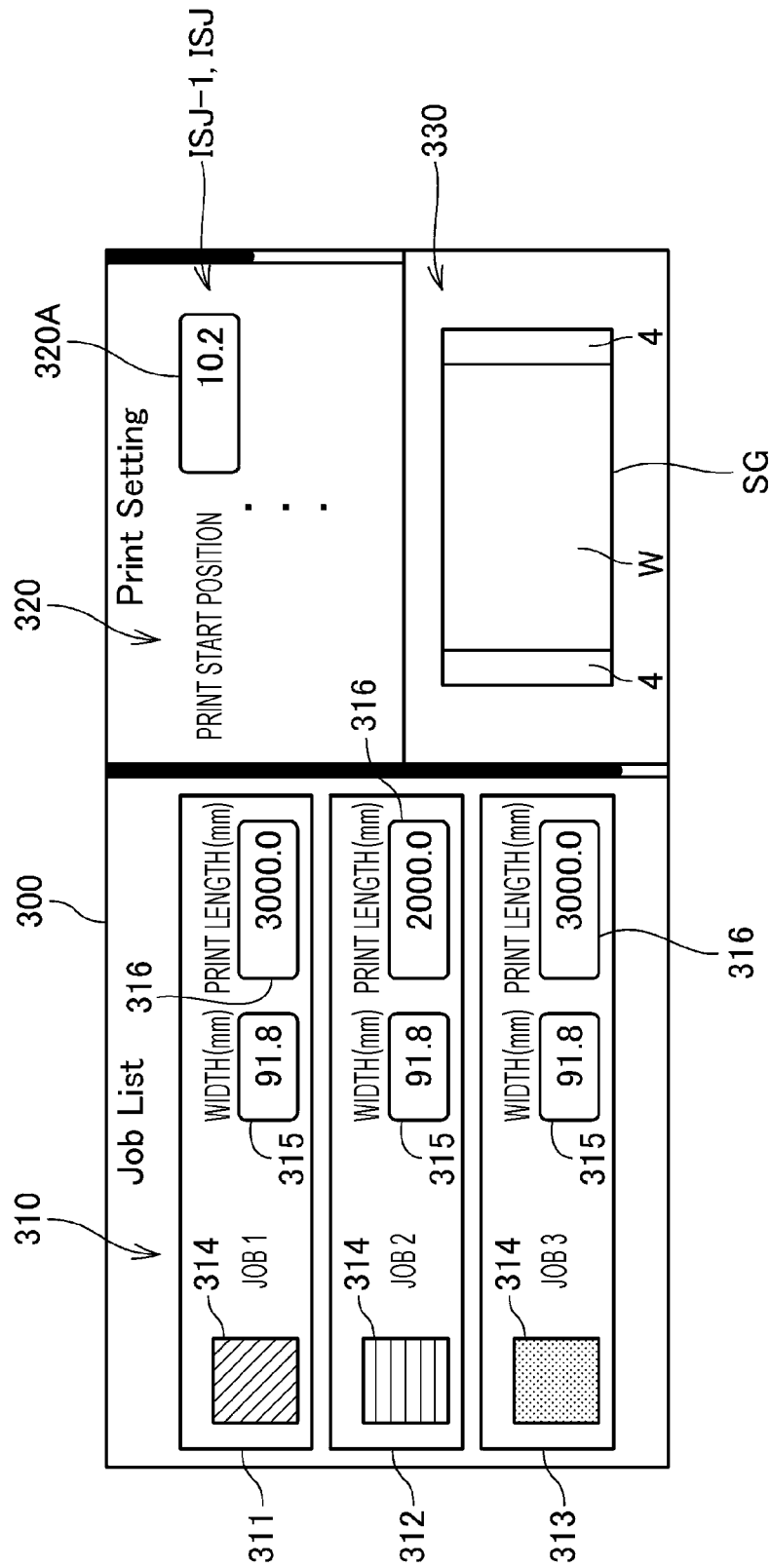
FIG. 8 illustrates an example of a print setting screen.

FIG. 8 is a view illustrating an example of the print setting screen 300.

The print setting screen 300 is a screen for performing settings related to the print start of the job group 130 selected in step SA7.

The print setting screen 300 includes a print job display section 310, a print setting display section 320, and a captured image display section 330.

The print job display section 310 is an area for displaying information related to each print job IJ included in the job group 130 selected in step SA7.

In the example of FIG. 8, the print job display section 310 includes print job content display sections 311, 312, and 313 corresponding to the three print jobs IJ. Each of the print job content display sections 311, 312, and 313 corresponds to one print job IJ, and the arrangement order of the print job content display sections 311, 312, and 313 which are arranged in order from the top in the print job display section 310 is an order which is the same as the execution order of the three print jobs IJ.

Each of the print job content display sections 311, 312, and 313 includes a thumbnail image 321 of an image printed by the corresponding print job IJ. The display control section 113 acquires the image data 123 from the storage section 120 based on the image designation information GJ included in the print job IJ, generates the thumbnail image 321 based on the acquired image data 123, and displays the generated thumbnail image 321 on the corresponding print job content display sections 311, 312, and 313.

Each of the print job content display sections 311, 312, and 313 has a width display section 315 and a print length display section 316.

In step SA8, the width display section 315 displays the width of the print medium W detected in step SA6. The unit notation of the width displayed by the width display section 315 may be any notation as long as the notation indicates the length even in a case of notation in millimeters and notation in meters. The width displayed by the width display section 315 can be changed by an input operation of the user. Here, it is preferable that the width displayed by the width display section 315 can be changed below the width displayed in step SA8. This is because, when the width is changed to be greater than the width of the print medium W detected by the determination section 115, there is a high possibility that the print on the print medium W is not appropriately performed.

In step SA8, the print length display section 316 displays the print length indicated by the print length information NJ included in the print job IJ. The unit notation of the print length displayed by the print length display section 316 may be any notation as long as the notation indicates the length even in a case of notation in millimeters and notation in meters. The print length displayed by the print length display section 316 may be changeable by the input operation of the user.

The print setting display section 320 displays one or a plurality of pieces of print setting information ISJ. The print setting information ISJ displayed by the print setting display section 320 may be different or the same for each of the print job content display sections 311, 312, and 313 displayed by the print job display section 310. The print setting information ISJ is information in which a character indicating an item of print setting and an item value display section 320A that displays an item value are associated with each other. In FIG. 8, the print setting display section 320 displays print setting information ISJ-1 in which a character indicating that there is an item at the print start position and the item value display section 320A that displays the print start position as an item value are associated with each other. The print setting display section 320 may display the print setting information ISJ related to the print conditions of the job group 130, in addition to the print setting information ISJ-1. For example, the print setting display section 320 may display the print setting information ISJ in which a character indicating a workpiece gap item and the item value display section 320A that displays the value of the workpiece gap included in the print condition as an item value are associated with each other.

The item value display section 320A of the print setting information ISJ-1 illustrated in FIG. 8 is displayed as a distance based on any one of the right end of the movable range IKA, the right end of the transport belt 4, the left end of the transport belt 4, and the left end of the movable range IKA. The unit notation of the print start position displayed by the item value display section 320A of the print setting information ISJ-1 may be any notation as long as the notation indicates the position in the intersecting direction K even in a case of the millimeter notation and the meter notation, but it is preferable that the unit notation is the same as that of the width display section 315 and the print length display section 316.

In step SA8, the item value display section 320A of the print setting information ISJ-1 illustrated in FIG. 8 displays the print start position determined in step SA5. The print start position displayed by the item value display section 320A of the print setting information ISJ-1 can be changed by the input operation of the user. Here, it is preferable that the print start position displayed by the item value display section 320A of the print setting information ISJ-1 cannot be changed to a value smaller than the print start position displayed in step SA8. This is because, when the value is changed to be smaller than the print start position detected by the determination section 115, there is a high possibility that the print on the print medium W is not appropriately performed.

The captured image display section 330 displays the captured image SG indicated by the captured image data 125. The captured image display section 330 may be configured to be disposed on the print setting screen 300 by default, and may be configured to be disposed on the print setting screen 300 when the user changes at least one of the width displayed by the width display section 315 and the print start position included in the print setting information ISJ.

Returning to the description of FIG. 6, the display control section 113 determines whether or not there is an input operation of the user on the print setting screen 300, based on the detection result of the input detection section 111 (step SA9).

When the display control section 113 determines that there is the input operation of the user (step SA9: YES), the display of the print setting screen 300 is updated (step SA10).

For example, when there is an input operation for changing the value displayed on the width display section 315 of the print job content display section 311 from "90.00" to "88.00", the display control section 113 updates the value displayed by the width display section 315 of the print job content display section 311 to "92.00". When executing the processing of step SA10, the display control section 113 executes the processing of step SA9 again.

Meanwhile, when the display control section 113 determines that there is no input operation of the user (step SA9: NO), the print control section 112 determines whether or not the print execution is instructed by the operation of the keyboard 1031 or the touch panel 1032. (step SA11).

When it is determined that the print execution is not instructed (step SA11: NO), the print control section 112 returns to the processing of step SA8.

Meanwhile, when it is determined that the print execution is instructed (step SA11: YES), the print control section 112 generates the print data for printing the job group 130 based on the print settings of the print setting screen 300 and the selected job group 130 (step SA12).

For example, when it is determined that the print execution is instructed in the state of the print setting screen 300 illustrated in FIG. 8, the print control section 112 generates the following print data in step SA12. In other words, the print control section 112 generates the print data for printing with respect to all print jobs IJ by setting the position of "10.2" from the predetermined reference as the print start position and the width of the print medium W as "91.8". This print data is print data set such that the size of the image of the image data 123 in the intersecting direction K for each print job IJ is equal to or smaller than the width of the print medium W. When the width of the print medium W is changed on the print setting screen 300, the print control section 112 generates the print data which is set such that the size of the image of the image data 123 in the intersecting direction K is equal to or smaller than the changed width of the print medium W.

Next, when the print control section 112 generates print data, the printing section 101 starts printing based on the generated print data (step SA13).

As described above, the printer 1 includes the printing section 101, the transport belt 4 that transports the print medium W, and the camera 7 that detects both end portions RTB in the intersecting direction K that intersects the transport direction H of the print medium W among the end portions of the print medium W placed on the transport belt 4. Further, the printer 1 includes the control section 100 that causes the printing section 101 to execute the printing based on the print data while one end portion TB of the both end portions RTB detected by the camera 7 is set as the print start position and the distance from one end portion TB to the other end portion TB is set as the width of the print medium W.

Further, in the control method of the printer 1, the printing section 101 is caused to execute the printing based on the print data while one end portion TB of the both end portions RTB detected by the camera 7 is set as the print start position and the distance from the one end portion TB to the other end portion TB is set as the width of the print medium W.

Further, the control program 121 executed by the control section 100 of the printer 1 causes the printing section 101 to execute the printing based on the print data in the control section 100 while one end portion TB of the both end portions RTB detected by the camera 7 is set as the print start position and the distance from the one end portion TB to the other end portion TB is set as the width of the print medium W.

According to the printer 1, the control method of the printer 1, and the control program 121, the printing section 101 is caused to execute the printing based on the print data based on the automatically determined print start position and the width of the print medium W, and thus, the operator does not need to manually determine the print start position and the width of the print medium W by measurement or the like before the start of printing. Therefore, the working time of the operator before the start of printing can be reduced, and the printer 1 can start printing immediately. Moreover, since the printing can be started immediately, the productivity of the printer 1 can be improved. Further, it is possible to prevent the print quality from deteriorating due to the measurement error of the operator or setting input error.

The printing section 101 has the print head 81. The camera 7 is provided downstream of the placement start position I1 where the transport belt 4 starts the placement of the print medium W and upstream of the print head 81, in the transport direction H.

With this configuration, the camera 7 can image the both end portions RTB of the print medium W placed on the transport belt 4 and the print medium W to be printed after the print head 81 starts printing. Therefore, the control section 100 can set the print start position and the width of the print medium W to values that match the print medium W printed by the print head 81 after the start of printing. Accordingly, the control section 100 can suppress deterioration of print quality in printing after the start of printing.

The control section 100 detects both end portions RTB by the camera 7 based on the color difference between the color of the transport belt 4 and the color of the print medium W.

With this configuration, both end portions RTB of the print medium W can be easily detected because the both end portions RTB are detected based on the color difference.

The control section 100 changes the print start position and the width of the print medium W determined by the camera 7 based on the input operation of the user, and the printing section 101 is caused to execute the printing based on the print data based on the changed print start position and the width of the print medium W.

At both end portions RTB of the print medium W, there is a case where the state may be different from the state of the area other than the both end portions RTB. In this case, when one of the both end portions RTB of the print medium W is set as the print start position and the distance between the both end portions RTB is set to the width of the print medium W in the intersecting direction K, printing is not appropriately performed at the both end portions RTB of the print medium W and the print quality of the printed product can deteriorate. Here, by making it possible to change the print start position and the width of the print medium W based on the input operation of the user, it becomes possible to perform printing in consideration of the state of the both end portions RTB, and it is possible to avoid deterioration of the print quality that can occur at both end portions RTB.

Particularly, when the print medium W is a fabric, there is a case where fibers may be frayed at the right end portion TB-R and the left end portion TB-L of the print medium W. In this case, when one of the both end portions RTB of the print medium W is set as the print start position and the distance between the both end portions RTB is set to the width of the print medium W in the intersecting direction K, printing is not appropriately performed at the both end portions RTB of the print medium W and the print quality of the printed product can deteriorate. Here, by making it possible to change the print start position and the width of the print medium W based on the input operation of the user, it becomes possible to perform printing avoiding the fraying of the both end portions RTB, and it is possible to avoid deterioration of the print quality that can occur at both end portions RTB.

The control section 100 displays the captured images SG of the both end portions RTB obtained by the camera 7 on the display 1033.

With this configuration, by displaying the captured image SG on the display 1033, the operator can confirm the state of both end portions RTB of the print medium W in the intersecting direction K. Further, since the operator can confirm the state of the both end portions RTB of the print medium W, it becomes easy to grasp how much the print start position and the width of the print medium W should be changed when changing at least one of the print start position and the width of the print medium W.

The print data is data for printing a pattern image of which print size is changed in accordance with the width of the print medium W determined by the camera 7.

With this configuration, the pattern image to be repeatedly printed can be appropriately printed on the print medium W regardless of the width of the print medium W and the placement position of the print medium W on the transport belt 4.

The print medium W is a fabric.

When the print medium W is a fabric, the width of the print medium W varies depending on the print medium W. In addition, when the printer 1 is configured to transport the print medium W by the transport belt 4, it is necessary to determine the width of the print medium W and the print start position each time printing is started. Here, the printer 1 of the present embodiment causes the printing section 101 to execute printing based on the print data based on the print start position and the width of the print medium W that are automatically determined. Therefore, the operator does not need to manually determine the print start position and the width of the print medium W by measurement or the like each time printing is started. Therefore, the working time of the operator can be reduced each time the printing is started, and the printer 1 can start printing immediately.

Second Embodiment

Next, a second embodiment will be described.

The second embodiment is different from the first embodiment in the place where the camera 7 is provided. In the second embodiment, the camera 7 is provided on the carriage 82.

Figure 9:
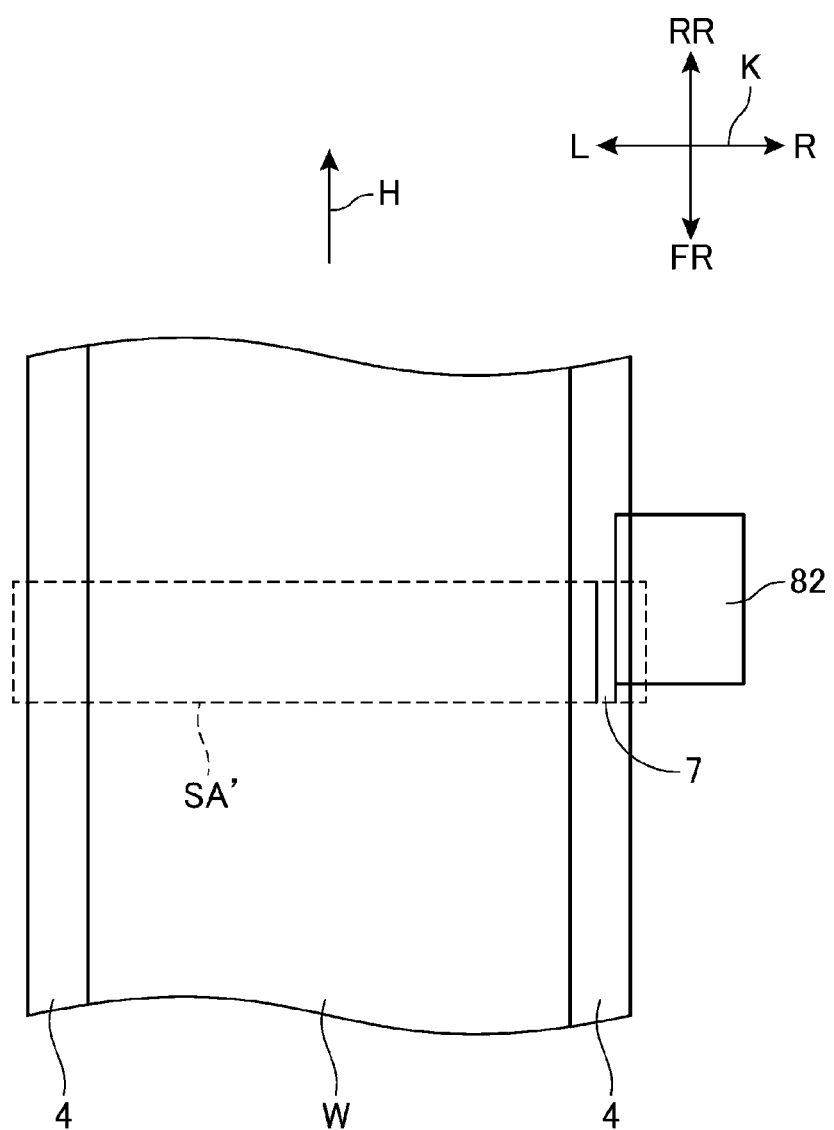
FIG. 9 is a view illustrating a disposition of a camera according to a second embodiment.

FIG. 9 is a view illustrating the installation of the camera 7 according to the second embodiment.

The camera 7 is provided on the carriage 82 and images the print medium W placed on the transport belt 4. An imaging range SA' of the camera 7 of the second embodiment is an area that includes both end portions of the transport belt 4 in the intersecting direction K and extends in the intersecting direction K.

In the second embodiment, when it is determined to start the setting related to the print start (step SA1: YES), the determination section 115 causes the camera 7 to start imaging while causing the carriage 82 to scan (step SA2). While causing the carriage 82 to scan, the determination section 115 performs edge detection with respect to the captured image SG obtained by the camera 7 to detect the right end portion TB-R and the left end portion TB-L. Then, the determination section 115 detects the positions of the right end portion TB-R and the left end portion TB-L based on the moving distance of the carriage 82 when detected by the edge detection (step SA3).

As described above, in the second embodiment, the camera 7 is provided on the carriage 82. Even with the configuration in which the camera 7 is provided on the carriage 82, the same effect as that of the first embodiment can be obtained. Furthermore, the following effects are achieved in the second embodiment. Since the camera 7 captures an image in the intersecting direction K using the scanning of the carriage 82, the imaging range SA' of the camera 7 may be narrower than the imaging range SA of the camera 7 that captures an image at a fixed position similar to the first embodiment. Accordingly, the camera 7 may be small, an increase in size of the carriage 82 can be suppressed, and it is advantageous in terms of cost.

Third Embodiment

Next, a third embodiment will be described.

Figure 10:
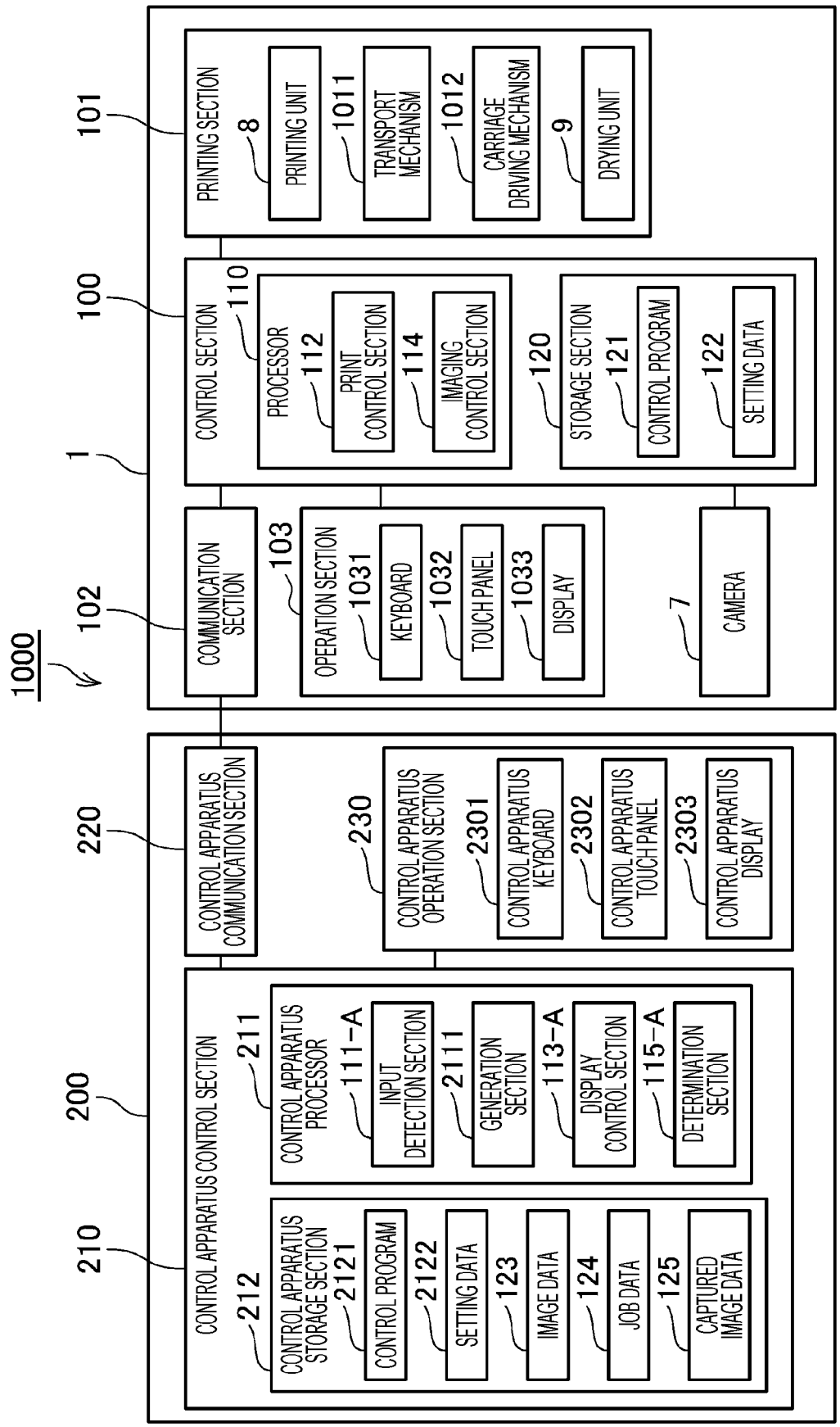
FIG. 10 is a view illustrating a configuration of a printing system according to a third embodiment.

FIG. 10 is a view illustrating a configuration of a printing system 1000 according to the third embodiment.

In FIG. 10, regarding the configuration of each member of the printer 1 of the third embodiment, when the configuration is the same as that of each member of the first embodiment and the second embodiment, the same reference numerals will be given and the detailed description thereof will be omitted.

The printing system 1000 includes the printer 1 and a host computer 200. The host computer 200 is a control apparatus that controls the printer 1, and corresponds to an example of a printing control apparatus.

The host computer 200 includes a control apparatus control section 210.

The control apparatus control section 210 includes a control apparatus processor 211, which is a processor that executes programs, such as a CPU or an MPU, and a control apparatus storage section 212, and controls each member of the host computer 200. The control apparatus control section 210 executes various types of processing by cooperation of hardware and software such that the control apparatus processor 211 reads a control program 2121 stored in the control apparatus storage section 212 and executes the processing. The control apparatus processor 211 functions as an input detection section 111-A, a generation section 2111, a display control section 113-A, and a determination section 115-A by reading and executing the control program 2121. These functional sections will be described later.

The control apparatus storage section 212 has a storage area that stores a program executed by the control apparatus processor 211 and data processed by the control apparatus processor 211. The control apparatus storage section 212 stores the control program 2121 executed by the control apparatus processor 211 and setting data 2122 including various setting values related to the operation of the host computer 200. The control apparatus storage section 212 has a non-volatile storage area that stores programs or data in a non-volatile manner. In addition, the control apparatus storage section 212 may include a volatile storage area and may be configured to temporarily store a program executed by the control apparatus processor 211 or data to be processed.

The host computer 200 includes a control apparatus communication section 220.

The control apparatus communication section 220 is configured of communication hardware such as a connector or an interface circuit according to a predetermined communication standard, and communicates with the printer 1 according to the control of the control apparatus control section 210.

The host computer 200 includes a control apparatus operation section 230.

The control apparatus operation section 230 includes a control apparatus keyboard 2301 which is a keyboard, a control apparatus touch panel 2302 which is a touch panel, and a control apparatus display 2303 which is a display. The control apparatus operation section 230 may be configured to include only one of the control apparatus keyboard 2301 and the control apparatus touch panel 2302. In the embodiment, the control apparatus display 2303 corresponds to an example of the display section. The control apparatus keyboard 2301 has a plurality of keys operated by an operator, and outputs operation data indicating the operated keys to the control apparatus control section 210. The control apparatus display 2303 has a display screen such as a liquid crystal display (LCD), and displays an image according to the control of the control apparatus control section 210. The control apparatus touch panel 2302 is disposed so as to overlap the display screen of the control apparatus display 2303, detects a touch operation on the display screen, and outputs operation data indicating the touch position to the control apparatus control section 210.

Next, the configuration of the control apparatus control section 210 will be described.

The control apparatus control section 210 includes the input detection section 111-A, a generation section 2111, the display control section 113-A, and the determination section 115-A.

Further, the control apparatus control section 210 includes the control apparatus storage section 212.

The control apparatus storage section 212 stores the control program 2121, the setting data 2122, the image data 123, the job data 124, and the captured image data 125.

The input detection section 111-A functions similarly to the input detection section 111. The input detection section 111-A detects the input operation of the operator based on the operation data input from the control apparatus keyboard 2301 and the control apparatus touch panel 2302, and acquires the input content.

The generation section 2111 generates the print data based on the print setting screen 300 displayed on the control apparatus display 2303 by the display control section 113-A.

The display control section 113-A functions similarly to the display control section 113. The control apparatus display 2303 is controlled to display various images. The display control section 113-A of the embodiment displays the print setting screen 300 on the control apparatus display 2303.

The determination section 115-A functions similarly to the determination section 115. The determination section 115-A outputs the determined width of the print medium W and information indicating the print start position to the display control section 113-A.

Next, the operation of the printing system 1000 will be described.

Figure 11:
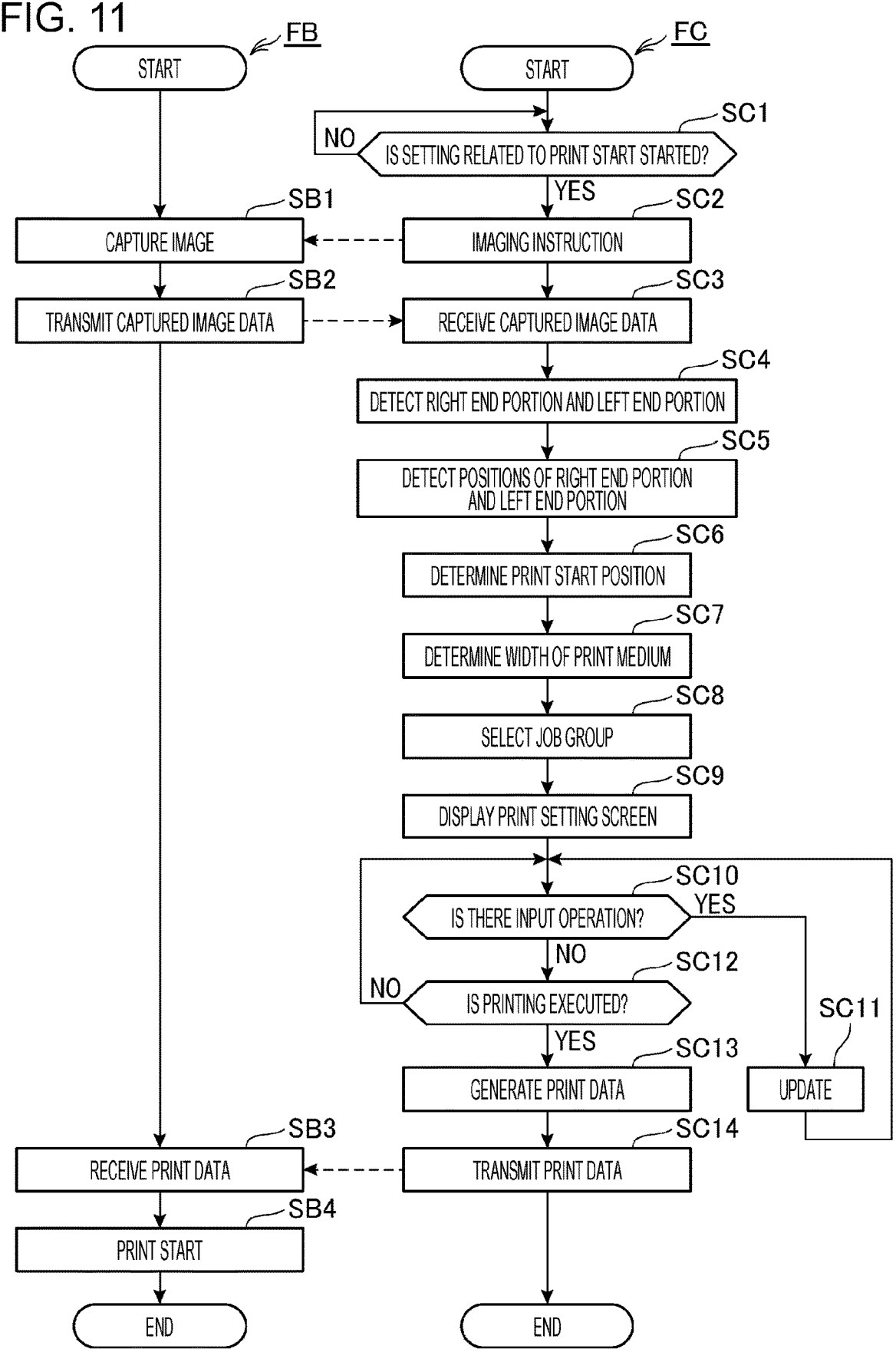
FIG. 11 is a flowchart illustrating an operation of the printing system.

FIG. 11 is a flowchart illustrating the operation of the printing system 1000. In FIG. 11, a flowchart FB illustrates the operation of the printer 1, and a flowchart FC illustrates the operation of the host computer 200.

At the start of the flowchart of FIG. 11, it is assumed that the print medium W is appropriately set so as to be transported by the transport belt 4.

With reference to the flowchart FC, the determination section 115-A of the host computer 200 determines whether or not to start the setting related to the print start (step SC1).

When it is determined to start the setting related to the print start (step SC1: YES), the determination section 115-A transmits an imaging instruction to the printer 1 by the control apparatus communication section 220 (step SC2).

With reference to the flowchart FB, the imaging control section 114 of the printer 1 receives the imaging instruction from the host computer 200, and captures an image using the camera 7 (step SB1).

Next, the imaging control section 114 transmits the captured image data 125 obtained by the imaging of the camera 7 to the host computer 200 by the communication section 102 (step SB2).

With reference to the flowchart FC, the determination section 115-A receives the captured image data 125 by control apparatus communication section 220 (step SC3). The determination section 115-A stores the received captured image data 125 in the control apparatus storage section 212.

Next, similar to step SA3, the determination section 115-A detects the right end portion TB-R and the left end portion TB-L of the print medium W based on the captured image SG indicated by the captured image data 125 stored in the control apparatus storage section 212 (step SC4).

Next, similar to step SA4, the determination section 115-A detects the position in the intersecting direction K for each of the detected right end portion TB-R and left end portion TB-L (step SC5).

Next, similar to step SA5, the determination section 115-A determines the print start position based on the positions of the right end portion TB-R and the left end portion TB-L of the print medium W detected in step SC4 (step SC6).

Next, similar to step SA6, the determination section 115-A determines the width of the print medium W in the intersecting direction K based on the positions of the right end portion TB-R and the left end portion TB-L of the print medium W detected in step SC5 (step SC7). The processing order of steps SC6 and SC7 may be reversed.

Next, the determination section 115-A selects the job group 130 to be executed from the job groups 130 included in the job data 124 according to the input operation detected by the control apparatus operation section 230 (step SC8).

Next, the display control section 113-A displays a print setting screen 300 on the display 1033 (step SC9).

Next, the display control section 113-A determines whether or not there is an input operation of the user on the print setting screen 300, based on the detection result of the input detection section 111-A (step SC10).

When the display control section 113-A determines that there is the input operation of the user (step SC10: YES), the display of the print setting screen 300 is updated (step SC11).

Meanwhile, when the display control section 113-A determines that there is no input operation of the user (step SC10: NO), the generation section 2111 determines whether or not the print execution is instructed by the operation of the control apparatus keyboard 2301 or the control apparatus touch panel 2302. (step SC12).

When it is determined that the print execution is not instructed (step SC12: NO), the generation section 2111 returns to the processing of step SC10.

Meanwhile, when it is determined that the print execution is instructed (step SC12: YES), the generation section 2111 generates the print data for printing the job group 130 based on the print settings of the print setting screen 300 (step SC13). The print data generated by the generation section 2111 is the print data which is the same as the print data generated by the print control section 112 described in the first embodiment.

Next, the generation section 2111 transmits the generated print data to the printer 1 by the control apparatus communication section 220 (step SC14).

With reference to the flowchart FB, the print control section 112 of printer 1 receives the print data by the communication section 102 (step SB3), and starts printing based on the received print data (step SB4).

As described above, the host computer 200 that controls the printer 1 includes the control apparatus control section 210 that causes the printing section 101 to execute the printing based on the print data while the one end portion of the both end portions RTB detected by the camera 7 is set to as the print start position and the distance from one end portion to the other end portion is set to as the width of the print medium W.

According to the host computer 200, the printing section 101 is caused to execute the printing based on the print data based on the automatically determined print start position and the width of the print medium W, and thus, the operator does not need to manually determine the print start position and the width of the print medium W by measurement or the like before the start of printing. Therefore, the working time of the operator before the start of printing can be reduced, and the printer 1 can start printing immediately. Moreover, since the printing can be started immediately, the productivity of the printer 1 can be improved. Further, it is possible to prevent the print quality from deteriorating due to the measurement error of the operator or setting input error.

Each of the above-described embodiments illustrates one specific example to which the disclosure is applied, and the disclosure is not limited thereto.

For example, in the above-described first to third embodiments, the camera 7 is exemplified as the sensor, but any sensor can be adopted as long as the sensor is capable of detecting both end portions RTB of the print medium W, and for example, may be a sensor such as a contact type or optical type sensor.

For example, in each of the above-described embodiments, the printer 1 that transports the print medium W wound in a roll shape and prints an image was described as an example, but the disclosure is not limited thereto. For example, the disclosure can be applied to a printing apparatus that performs printing by fixing and holding the print medium W such as a fabric to be printed and moving the print head 81 relative to the print medium W. For example, the disclosure may be applied to a so-called garment printer in which clothes or sewing a fabric is fixed as the print medium W and the ink IK is discharged onto the print medium W for printing. Further, the disclosure may be applied to a printing apparatus that performs printing on not only a fabric but also a knit fabric, paper, synthetic resin sheets, and the like.

Further, the application target of the disclosure is not limited to an apparatus used alone as a printing apparatus, and may be applied to an apparatus having a function other than printing, such as a multifunction machine having a copy function or a scan function or a POS terminal device.

The printer 1 may be an apparatus that uses the ink IK that is cured by irradiation with ultraviolet rays, and in this case, the printer 1 may be provided with an ultraviolet irradiation apparatus instead of the drying unit 9. Further, the printer 1 may be configured to include a cleaning apparatus that cleans the print medium W dried by the drying unit 9, and other detailed configurations of the printer 1 can be changed in any manner.

Further, each functional section of the control section 100 can be configured as the control program 121 executed by the processor 110 as described above, and additionally can be realized by a hardware circuit in which the control program 121 is incorporated. Further, the printer 1 may be configured to receive the control program 121 from a server apparatus or the like via a transmission medium. The same applies to each functional section of the control apparatus control section 210.

The functions of the control section 100 and the control apparatus control section 210 may be realized by a plurality of processors or semiconductor chips.

Further, for example, the step unit of the operation illustrated in FIGS. 6 and 11 is divided in accordance with the main processing content in order to make it easy to understand the operation of the printer 1 and the host computer 200, and thus, the disclosure is not limited by the division method or name of the processing unit. The step unit may be divided into a larger number of step units in accordance with the processing content. Further, one step unit may be divided so as to include more number of processing. Further, the order of the steps may be appropriately changed within a range that does not interfere with the gist of the disclosure

What is claimed is:

1. A printing apparatus comprising:
a printing section;
a transport belt that is configured to transport a print medium that is placed on a transport belt;
a controller and;
a camera that is configured to capture an image of an area that covers a whole width of the transport belt to thereby generate a captured image that includes imaging of both end portions of the print medium in an intersecting direction that intersects a transport direction of the print medium, the printing apparatus configured to provide the captured image to the controller;
the controller configured to detect a position of both end portions of the print medium by evaluating the captured image based on a color difference in the captured image between an image color of the transport belt and an image color of the print medium, the controller further configured to cause the printing section to execute printing based on print data while one end portion of the both end portions detected by the sensor is set as a print start position and a distance from one end portion to the other end portion is set as width of the print medium;
wherein, the detection of the position of both end portions of the print medium being performed by: determining a right end portion of the print medium as captured in the captured image is separated from the right end of the captured image by a first number of pixels to the left;
and determining a left end portion of the print medium as captured in the captured image is separated from the left end of the captured image by a second number of pixels to the right;
calculating a first distance in the intersecting direction from the right end portion of the print medium to a right side of the transport belt based on the first number of pixels;
and calculating a second distance in the intersecting direction from the left end portion of the print medium to a left side of the transport belt based on the second number of pixels.

2. The printing apparatus according to claim 1, wherein the printing section includes a print head, and
the sensor is provided downstream of a placement start position at which the transport belt starts placement of the print medium and upstream of the print head in the transport direction.

3. The printing apparatus according to claim 1, wherein the printing section includes a print head and a carriage on which the print head is mounted, and
the sensor is provided in the carriage.

4. The printing apparatus according to claim 1, wherein the controller changes the print start position determined by the sensor and the width of the print medium based on an input operation of a user, and causes the printing section to execute printing based on the print data, based on the changed print start position and the changed width of the print medium.

5. The printing apparatus according to claim 1, wherein the print data is data for printing a pattern image having a print size changed in accordance with the width of the print medium determined by the sensor.

6. The printing apparatus according to claim 1, wherein the print medium is a fabric.

7. A control method of a printing apparatus including a printing section, a transport belt that transports a print medium, and a camera that captures
an image of an area that covers a whole width of the transport belt to thereby generate a captured image that includes imaging of both end portions of the print medium in an intersecting direction that intersects a transport direction of the print medium, the method comprising:
detecting a position of both end portions of the print medium by evaluating the captured on a color difference in the captured image between an image color of the transport belt and an image color of the print medium;
causing the printing section to execute printing based on print data while one end portion of the both end portions detected by the sensor is set as a print start position and a distance from the one end portion to the other end portion is set as a width of the print medium;
wherein, the detecting of the position of both end portions of the print medium being performed by: determining a right end portion of the print medium as captured in the captured image is separated from the right end of the captured image by a first number of pixels to the left;
and determining a left end portion of the print medium as captured in the captured image is separated from the left end of the captured image by a second number of pixels to the right;
calculating a first distance in the intersecting direction from the right end portion of the print medium to a right side of the transport belt based on the first number of pixels;
and calculating a second distance in the intersecting direction from the left end portion of the print medium to a left side of the transport belt based on the second number of pixels.

* * * * *